(12) United States Patent
Saito et al.

(10) Patent No.: US 12,060,019 B2
(45) Date of Patent: Aug. 13, 2024

(54) VEHICLE FRONT STRUCTURE

(71) Applicants: TOYOTA JIDOSHA KABUSHIKI KAISHA, Aichi (JP); NIPPON STEEL CORPORATION, Tokyo (JP)

(72) Inventors: Naohiro Saito, Toyota (JP); Junichi Takayanagi, Nagoya (JP); Ryoichi Hayashi, Kariya (JP); Atsushi Ono, Tokyo (JP); Atsuo Koga, Tokyo (JP)

(73) Assignees: TOYOTA JIDOSHA KABUSHIKI KAISHA, Aichi-Ken (JP); NIPPON STEEL CORPORATION, Tokyo (JP)

( * ) Notice: Subject to any disclaimer, the term of this patent is extended or adjusted under 35 U.S.C. 154(b) by 202 days.

(21) Appl. No.: 17/435,402

(22) PCT Filed: Mar. 6, 2020

(86) PCT No.: PCT/JP2020/009711
§ 371 (c)(1),
(2) Date: Sep. 1, 2021

(87) PCT Pub. No.: WO2020/179914
PCT Pub. Date: Sep. 10, 2020

(65) Prior Publication Data
US 2022/0144196 A1    May 12, 2022

(30) Foreign Application Priority Data
Mar. 7, 2019    (JP) .................... 2019-041614

(51) Int. Cl.
*B60R 19/04* (2006.01)
*B60R 19/14* (2006.01)
(Continued)

(52) U.S. Cl.
CPC .............. *B60R 19/04* (2013.01); *B60R 19/14* (2013.01); *B60R 19/18* (2013.01); *B62D 25/08* (2013.01)

(58) Field of Classification Search
CPC . B60R 19/04; B60R 19/18; B60R 2019/1813; B60R 19/14;
(Continued)

(56) References Cited

U.S. PATENT DOCUMENTS

| 10,604,093 B2 * | 3/2020 | Saito .................... B62D 21/152 |
| 2008/0048462 A1 * | 2/2008 | Zabik ...................... B60R 19/18 |
| | | 293/120 |

(Continued)

FOREIGN PATENT DOCUMENTS

| JP | H820297 A | 1/1996 |
| JP | 200267840 A | 3/2002 |

(Continued)

OTHER PUBLICATIONS

WO-2018207668-A1 computer translation (Year: 2018).*

(Continued)

*Primary Examiner* — Amy R Weisberg
*Assistant Examiner* — Melissa Ann Bonifazi
(74) *Attorney, Agent, or Firm* — HAUPTMAN HAM, LLP

(57) ABSTRACT

A vehicle front structure including a left and right pair of front side members, a bumper reinforcement and a power unit. The bumper reinforcement includes a first breakage initiation point at a position at one vehicle width direction side relative to a vehicle width direction center position of the vehicle, and a second breakage initiation point at a position at the other vehicle width direction side. The first breakage initiation point is a region at which bending yield strength is lower than other regions of the bumper reinforcement. The second breakage initiation point is a region with lower bending yield strength than the other regions but higher bending yield strength than the first breakage initiation point. The bumper reinforcement includes a bumper reinforcement main body with a chamber structure and a bracing member inside the bumper reinforcement main body at the vehicle width direction center position of the vehicle.

4 Claims, 12 Drawing Sheets

(51) Int. Cl.
  *B60R 19/18* (2006.01)
  *B62D 25/08* (2006.01)

(58) Field of Classification Search
  CPC .... B60R 2019/1846; B60R 2019/1866; B60R 2021/0025; B62D 25/08
  USPC .................................................. 293/102, 133
  See application file for complete search history.

(56) References Cited

U.S. PATENT DOCUMENTS

| | | | |
|---|---|---|---|
| 2014/0070552 A1* | 3/2014 | Shimotsu | B60R 19/18 293/102 |
| 2016/0264082 A1* | 9/2016 | Berger | B60R 19/03 |
| 2018/0345890 A1 | 12/2018 | Kuwabara et al. | |
| 2020/0139911 A1 | 5/2020 | Hirose | |

FOREIGN PATENT DOCUMENTS

| | | | | |
|---|---|---|---|---|
| JP | 200454909 | A | | 2/2004 |
| JP | 201454909 | A | | 3/2014 |
| JP | 2015147437 | A | | 8/2015 |
| JP | 6399268 | B1 | | 10/2018 |
| JP | 2018176889 | A | | 11/2018 |
| JP | 2018202897 | A | | 12/2018 |
| KR | 20170027212 | A | * | 3/2017 |
| WO | WO-2018207668 | A1 | * | 11/2018 ............. B60R 19/04 |
| WO | WO-202085383 | A1 | * | 4/2020 |
| WO | WO-2020085385 | A1 | * | 4/2020 ............. B60R 19/18 |

OTHER PUBLICATIONS

WO-202085383-A1 computer translation (Year: 2020).*
KR-20170027212-A computer translation (Year: 2017).*
WO-2020085385-A1 computer translation (Year: 2020).*

* cited by examiner

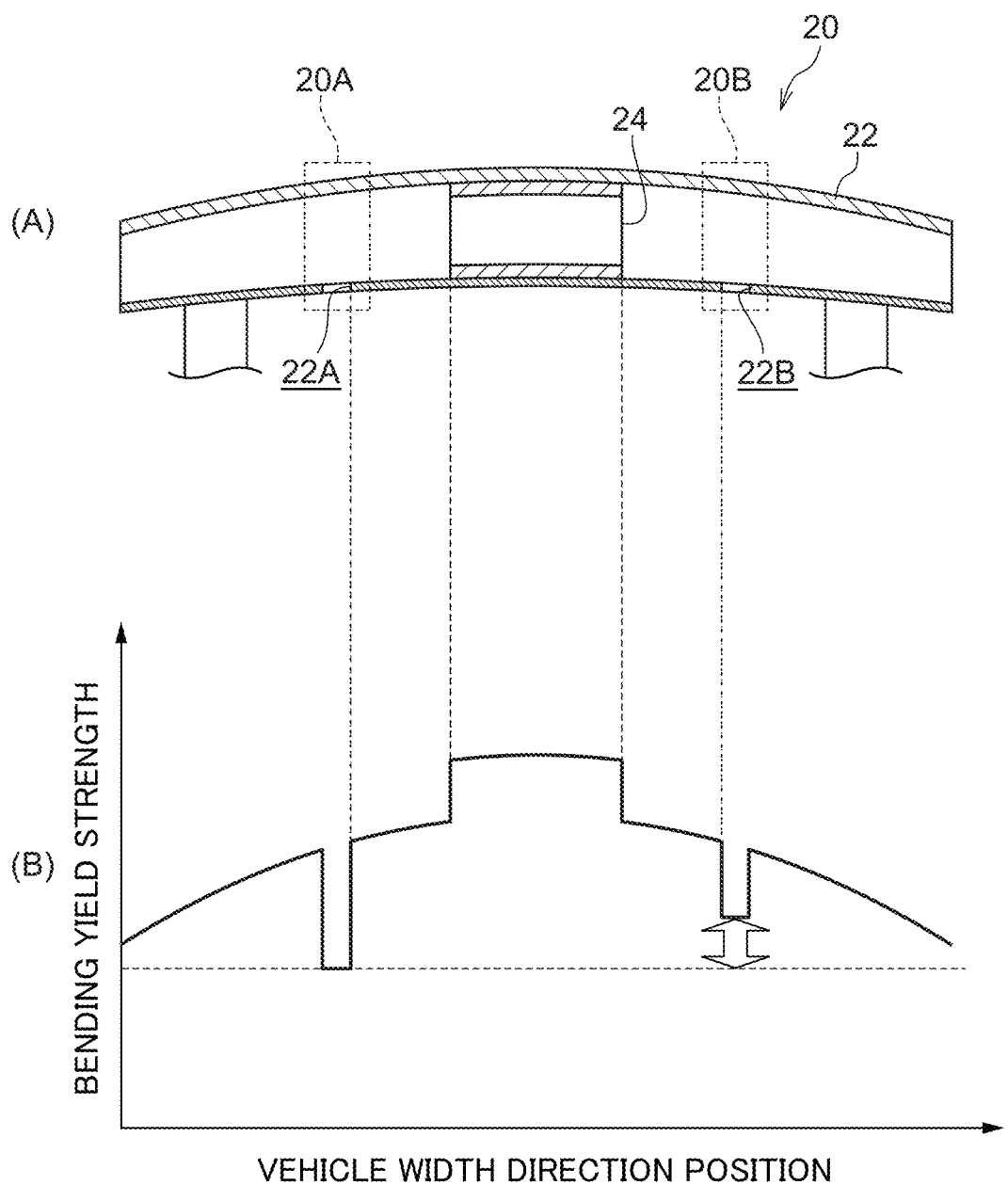

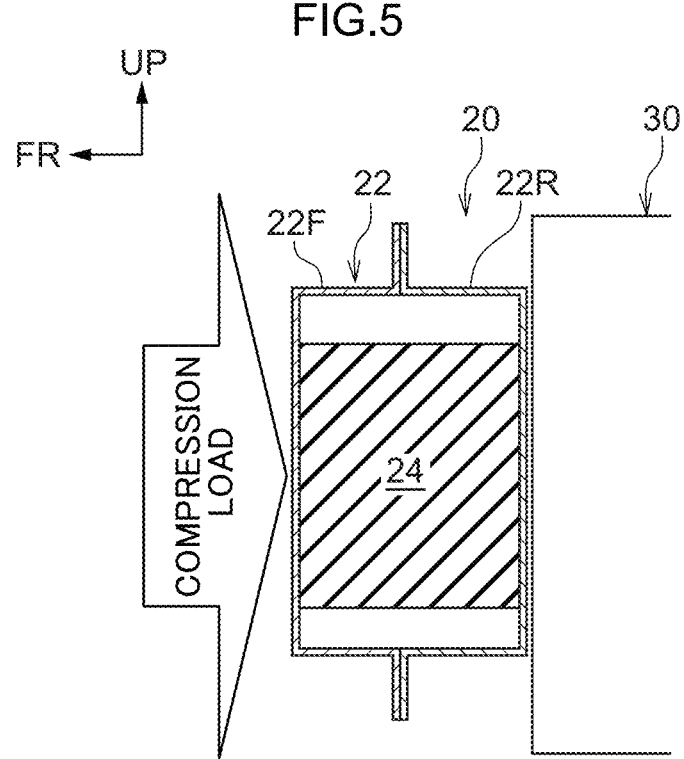

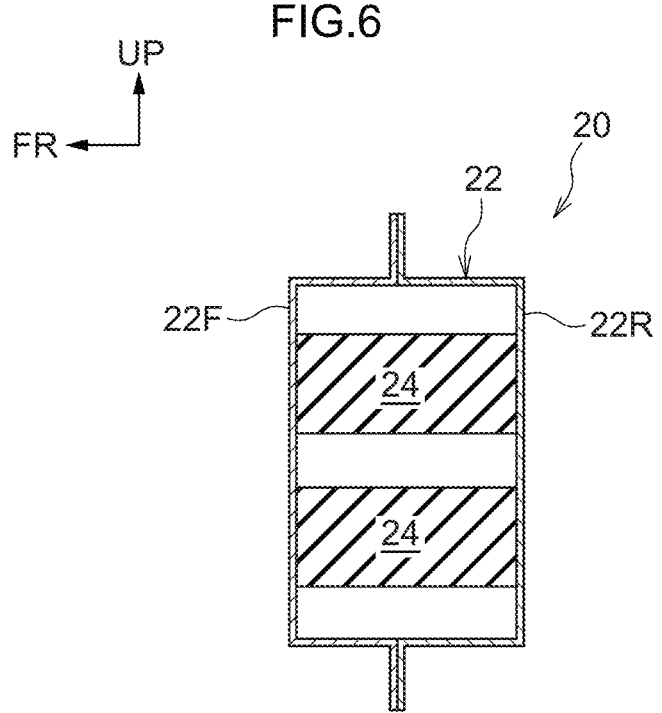

VEHICLE FRONT STRUCTURE

RELATED APPLICATIONS

The present application is a National Phase of International Application Number PCT/JP2020/009711, filed Mar. 6, 2020, and claims priorities of Japanese Patent Application No. 2019-041614 filed on Mar. 7, 2019.

TECHNICAL FIELD

The present disclosure relates to a vehicle front structure.

BACKGROUND ART

Heretofore, a vehicle front structure equipped with a bumper reinforcement (below referred to as a bumper RF) with a chamber structure) has been known (for example, see Patent Document 1).

RELATED ART REFERENCES

Patent Documents

Patent Document 1: Japanese Patent Application Laid-Open (JP-A) No. 2002-067840

SUMMARY OF INVENTION

Technical Problem

In a vehicle provided with the structure described above, when a pole-shaped object collides from the front at a vehicle width direction center position of the vehicle (below, this kind of collision is referred to as a "center pole collision"), the bumper reinforcement breaks at the vehicle width direction center position colliding with the pole. As a result, a load may be concentrated on a vehicle width direction central region of a power unit disposed to the vehicle rear of the bumper reinforcement.

An object of the present disclosure is to provide a vehicle front structure that, at a time of a center pole collision, may disperse a load on a power unit in a vehicle width direction.

Solution to Problem

A vehicle front structure according to a first aspect includes: a left and right pair of front side members that extend in a vehicle front-and-rear direction along a vehicle front portion; a bumper reinforcement that extends in a vehicle width direction and links front ends of the left and right pair of front side members with one another; and a power unit disposed between the left and right pair of front side members at the vehicle rear of the bumper reinforcement. The bumper reinforcement includes a first breakage initiation point at a position at one vehicle width direction side relative to a vehicle width direction center position of the vehicle, and a second breakage initiation point at a position at the other vehicle width direction side relative to the vehicle width direction center position of the vehicle. The first breakage initiation point is a region in which bending yield strength is specified to be lower than in other regions such that the first breakage initiation point breaks first when a pole-shaped object collides from the front at the vehicle width direction center position of the vehicle. The second breakage initiation point is a region with lower bending yield strength than the other regions but higher bending yield strength than the first breakage initiation point 20A. The bumper reinforcement includes a bumper reinforcement main body with a chamber structure, and a cross-sectional collapse prevention member provided inside the bumper reinforcement main body at the vehicle width direction center position of the vehicle.

In the vehicle front structure according to this aspect, the left and right pair of front side members extend along the vehicle front portion in the vehicle front-and-rear direction. The bumper reinforcement extends along the vehicle width direction and links the front ends of the left and right pair of front side members together. The power unit is disposed between the left and right pair of front side members, at the vehicle rear of the bumper reinforcement.

The bumper reinforcement includes the first breakage initiation point at a position at the vehicle width direction one side relative to the vehicle width direction center position of the vehicle, and the second breakage initiation point at a position at the vehicle width direction other side relative to the vehicle width direction center position of the vehicle.

The first breakage initiation point is a region that is specified with a relatively low bending yield strength compared to other regions, such that this region is first to break at the time of a center pole collision (when a pole-shaped object collides from the front at the vehicle width direction center position of the vehicle). The second breakage initiation point is a region with a lower bending yield strength than other regions but a higher bending yield strength than the first breakage initiation point.

At the time of a center pole collision, the vehicle front structure described above is likely to go into the deformation mode described below.

That is, at the time of the center pole collision, the bumper reinforcement does not break at the vehicle width direction center position colliding with the pole but breaks at the first breakage initiation point that is disposed offset from the vehicle width direction center position (the position at the vehicle width direction one side). The first breakage initiation point of the bumper reinforcement abuts against the power unit and transmits a collision load. Correspondingly, a reaction force from the power unit acts on the bumper reinforcement at the first breakage initiation point. As a result of this reaction force, a second breaking of the bumper reinforcement occurs. The second breaking is likely to occur at the second breakage initiation point. When the second breaking occurs at the second breakage initiation point, the power unit is pushed toward the vehicle rear by a span of the bumper reinforcement between the two broken portions (that is, a span that is wide in the vehicle width direction from the first breakage initiation point to the second breakage initiation point). Thus, the collision load may be dispersed in the vehicle width direction.

When two breaks are formed in the bumper reinforcement as described above, a large compression load in the vehicle front-and-rear direction acts on a region of the bumper reinforcement that is sandwiched between the power unit and the pole. Therefore, if the bumper reinforcement were formed as a chamber structure, the cross section of the bumper reinforcement might collapse in this region. If the cross section of the bumper reinforcement collapses, the load on the power unit is concentrated at the collapsed region after all, and the effect described above (that is, the effect of the collision load being dispersed in the vehicle width direction) may not be provided sufficiently.

Accordingly, in this vehicle front structure, the bumper reinforcement includes the bumper reinforcement main body with the chamber structure and the cross-sectional collapse prevention member that is provided inside the bumper reinforcement main body at the vehicle width direction center position of the vehicle. Because the cross-sectional collapse prevention member is provided inside the bumper reinforcement main body at the vehicle width direction center position of the vehicle, crushing of the cross section in the vicinity of the vehicle width direction center position of the bumper reinforcement is prevented or suppressed.

Therefore, at the time of a center pole collision, even when the bumper reinforcement is sandwiched between the power unit and the pole, a collapse of the cross section of the bumper reinforcement main body is prevented or suppressed. As a result, concentration of a load on a portion of the power unit is suppressed.

The meaning of the term "collapse of the cross section of the bumper reinforcement" as used in the present disclosure is intended to include a deformation in which the shape of a cross section intersecting a direction of extension of the bumper reinforcement (the vehicle width direction) is narrowed in the vehicle front-and-rear direction.

Advantageous Effects of Invention

According to the present disclosure, at the time of a center pole collision, a load on a power unit may be dispersed in a vehicle width direction.

BRIEF DESCRIPTION OF DRAWINGS

FIG. 2 is diagram showing an example of structure of the bumper reinforcement and bending yield strengths thereof.

FIG. 5 is a schematic sectional view showing the bumper reinforcement according to the exemplary embodiment.

FIG. 6 is a schematic sectional view showing a variant example of a bracing member.

DESCRIPTION OF EMBODIMENTS

Figure 1A:
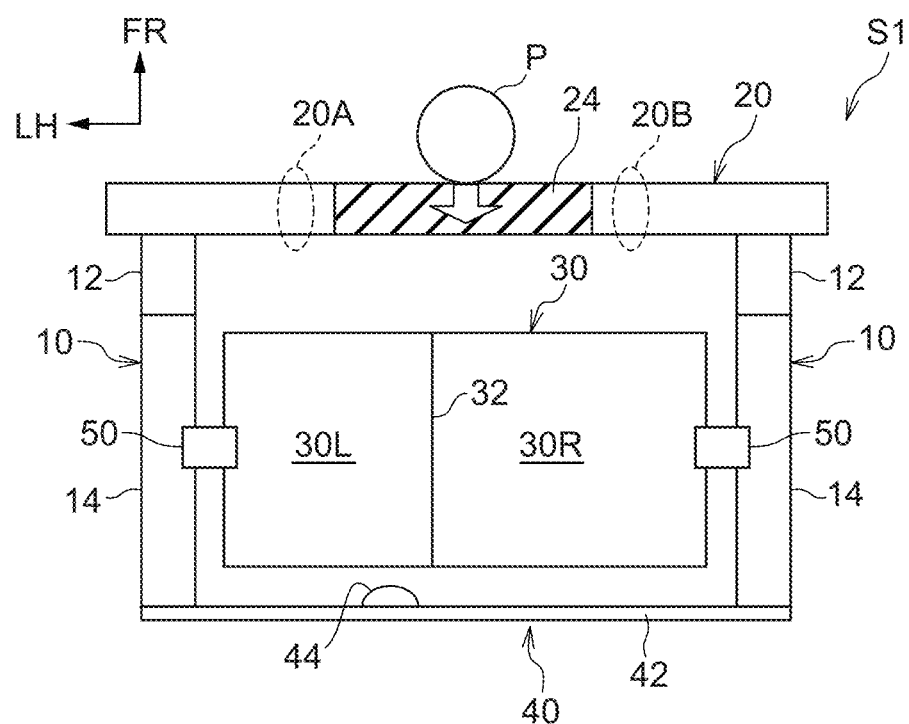
FIG. 1A is a schematic plan view showing a vehicle front structure according to an exemplary embodiment.

An exemplary embodiment of the present disclosure is described below.

The arrow FR that is shown where appropriate in the drawings indicates a vehicle front, the arrow LH indicates a vehicle width direction left side, and the arrow UP indicates a vehicle upper direction. Where the directions front, rear, left, right, upper and lower are referred to below without being particularly specified, these terms refer to front and rear in the vehicle front-and-rear direction, left and right in the vehicle width direction, and upper and lower in the vehicle.

FIG. 1A is a schematic plan view of a vehicle front structure S1 according to the present exemplary embodiment.

The vehicle front structure S1 is provided with a left and right pair of front side members 10. The front side members 10 are vehicle body framework members, length directions of which are oriented in the vehicle front-and-rear direction. The left and right pair of front side members 10 are provided with left-and-right symmetry about a vehicle width direction centerline of the vehicle.

A front end portion of each front side member 10 serves as a deformation portion 12. The deformation portion 12 is a region that is specified with a lower strength with respect to loads in the vehicle front-and-rear direction than a main body portion 14 (regions of the front side member 10 other than the deformation portion 12). Examples of the deformation portion 12 include a crush box fabricated of, for example, aluminum, fiber-reinforced plastic or steel.

The vehicle front structure S1 is further provided with a bumper reinforcement 20. The bumper reinforcement 20 is a vehicle body framework member that extends in the vehicle width direction. The bumper reinforcement 20 links front ends of the left and right pair of front side members 10 with one another. More specifically, front ends of the deformation portions 12 of the left and right pair of front side members 10 are joined to a rear face of the bumper reinforcement 20. The bumper reinforcement 20 is schematically illustrated as extending linearly in the vehicle width direction, but the bumper reinforcement 20 may be formed in a shape in which both of vehicle width direction side portions of the bumper reinforcement 20 are angled to the vehicle rear side. That is, the bumper reinforcement 20 may be formed overall in a bow shape arched to the vehicle front side. More detailed structure of the bumper reinforcement 20 is described below.

The vehicle front structure S1 is provided with a power unit 30 that is disposed between the left and right pair of front side members 10, to the vehicle rear of the bumper reinforcement 20. The power unit 30 is constituted by a transaxle 30L, which serves as a left side apparatus, and an engine 30R, which serves as a right side apparatus, being connected with one another. The power unit 30 is supported at the main body portions 14 of the left and right pair of front side members 10 via left and right engine mounts 50. Although not shown in the drawings, the power unit 30 is supported from the vehicle lower side at a portion of the transaxle 30L. A width dimension of the engine 30R is greater than a width dimension of the transaxle 30L. Thus, a connection region 32 is disposed offset to the left side relative to a vehicle width direction center position.

The vehicle front structure S1 is provided with a dash portion 40. The dash portion 40 is a part that separates a space in which the power unit 30 is disposed (an engine compartment) from a passenger compartment. That is, the dash portion 40 structures a front end of the passenger compartment. The dash portion 40 includes a dash panel 42 and a dash cross-member, which is not shown in the drawings. Rear ends of the left and right pair of front side members 10 are joined to the dash panel 42. A gearbox 44 is provided at the front of the dash panel 42. The gearbox 44 is disposed so as to protrude to the vehicle front side relative to the dash panel 42. Therefore, in the present exemplary embodiment, if the power unit 30 is translated toward the vehicle rear, the gearbox 44 will be the first structure to brace the power unit 30. That is, the gearbox 44 of the present exemplary embodiment corresponds to a rear bracing portion of the present disclosure. The gearbox 44 is disposed at a position to the rear of the transaxle 30L, which is a position that is offset to the left side relative to the vehicle width direction center position.

Now, detailed structure of the bumper reinforcement 20 is described.

The bumper reinforcement 20 includes a first breakage initiation point 20A at a position that is offset (a position offset to the left side in the present exemplary embodiment) from the vehicle width direction center position. The first breakage initiation point 20A is a region of the bumper reinforcement 20 that is specified so as to break first at a time of a center pole collision.

That is, usually when a center pole collision occurs, the bumper reinforcement 20 would be likely to break at a vehicle width direction center position at which a load from a pole P is directly applied. However, the bumper reinforcement 20 according to the present exemplary embodiment is structured such that, by bending yield strength being specified suitably in accordance with positions in the vehicle width direction, a region that breaks first at the time of a center pole collision is at a position (the position of the first breakage initiation point 20A) that is offset from the vehicle width direction center position (see FIG. 1B).

The bumper reinforcement 20 also includes a second breakage initiation point 20B that is disposed at the opposite side of the vehicle width direction center position from the side thereof at which the first breakage initiation point 20A is disposed. The second breakage initiation point 20B is a region that is specified so as to break subsequently to the first breakage initiation point 20A at the time of the center pole collision. The second breakage initiation point 20B is formed by the bending yield strength of the bumper reinforcement 20 being suitably specified in accordance with positions in the vehicle width direction. The second breakage initiation point 20B is provided at a position that is symmetrical with the first breakage initiation point 20A about the vehicle width direction center position.

To give another description, the bumper reinforcement 20 includes two breakage initiation points (the first breakage initiation point 20A and the second breakage initiation point 20B) sandwiching the vehicle width direction center position. The bending yield strength of the first breakage initiation point 20A is specified to be lower than the bending yield strength of the second breakage initiation point 20B. Thus, in the bumper reinforcement 20, the first breakage initiation point 20A is controlled to be the first part of the bumper reinforcement 20 to break at the time of a center pole collision, and the second breakage initiation point 20B is controlled to break next after the first breakage initiation point 20A.

The bumper reinforcement 20 described above (the bumper reinforcement 20 in which the bending yield strength is specified in accordance with positions in the vehicle width direction) may be realized by, for example, the bumper reinforcement structure shown in FIG. 2.

The bumper reinforcement 20 shown in FIG. 2A includes a bumper reinforcement main body 22 and a bracing member 24. The bumper reinforcement main body 22 is formed with a chamber structure and extends in the vehicle width direction. The bracing member 24 is disposed inside the bumper reinforcement main body 22.

A hole 22A is formed in the bumper reinforcement main body 22 at the position that is to serve as the first breakage initiation point 20A, and a hole 22B is formed at the position of the second breakage initiation point 20B. The hole 22A is formed in a rear wall of the bumper reinforcement main body 22 with the chamber structure.

The bracing member 24 is disposed at the vehicle width direction center position of the vehicle. The bracing member 24 has a certain length in the vehicle width direction. Thus, the bracing member 24 extends in a certain span in the vehicle width direction inside the bumper reinforcement main body 22 (a certain span that is a span including the vehicle width direction center position and is wide in the vehicle width direction). In the illustrated mode, the span through which the bracing member 24 extends is a smaller span than a span between the first breakage initiation point 20A and the second breakage initiation point 20B. The bracing member 24 is a member for preventing or suppressing crushing of the cross section of the bumper reinforcement 20 in the vicinity of the vehicle width direction center position. A material of the bracing member 24 is not particularly limited and is, for example, a resin, metal or wood. The structure of the bracing member 24 is not particularly limited and may be, for example, a hollow member (for example, as shown in the drawings, a member of which a cross section intersecting the length direction of the bumper reinforcement 20 is a chamber structure and the interior of which is a cavity).

The span through which the bracing member 24 extends is preferably at least 10% of the span between the first breakage initiation point 20A and the second breakage initiation point 20B. With regard to dispersing a load effectively, a length that the bracing member 24 extends in the vehicle width direction is preferably at least 100 mm and more preferably at least 150 mm.

As shown in FIG. 5, the bumper reinforcement main body 22 includes a front side member 22F, which is a press-formed component, and a rear side member 22R, which is a press-formed component. The bumper reinforcement main body 22 is formed in a chamber structure by the front side member 22F and the rear side member 22R being joined to one another by resistance spot welding or the like. When the bumper reinforcement main body 22 is formed in this way, the size of the cross section of the bumper reinforcement main body 22 may be changed in accordance with positions in the vehicle width direction more easily than in, for example, a chamber structure formed as an extruded member.

As shown in the sectional view in FIG. 5, the front side member 22F is in a hat shape that opens to the vehicle rear side, and the rear side member 22R is in a hat shape that opens to the vehicle front side. However, cross-sectional shapes of the front side member 22F and the rear side member 22R are not particularly limited. For example, the front side member 22F may be kept in a hat shape and the rear side member 22R may be formed in a substantially flat plate shape.

The bracing member 24 is disposed so as to be in area contact with a front wall and a rear wall of the bumper reinforcement main body 22. Therefore, the bracing member 24 may brace the front wall and rear wall of the bumper reinforcement main body 22 in the front-and-rear direction, and cross-sectional crushing of the bumper reinforcement main body 22 by a compression load in the front-and-rear direction may be suppressed effectively. Vertical spans of area contact of the bracing member 24 are, for example, at least 50% by proportion of vertical dimensions of the front wall and the rear wall of the bumper reinforcement main body 22, as shown in FIG. 5 (and more preferably at least 60%). However, spaces are provided inside the bumper reinforcement main body 22 at the upper side and lower side of the bracing member 24.

As shown in FIG. 5, a plural number of the bracing member 24 may be provided.

In the structure shown in FIG. 5, two of the bracing member 24 are provided, divided into upper and lower bracing members 24. The bracing member 24 at the upper side and the bracing member 24 at the lower side are disposed with a space therebetween in the vertical direction. A space is also provided inside the bumper reinforcement main body 22 above the bracing member 24 at the upper side and a space is provided below the bracing member 24 at the lower side.

The bracing member 24 is joined to the bumper reinforcement main body 22. A mode of joining the bracing member 24 to the bumper reinforcement main body 22 is, for example, welding, adhesion or fastening.

Figure 3A:
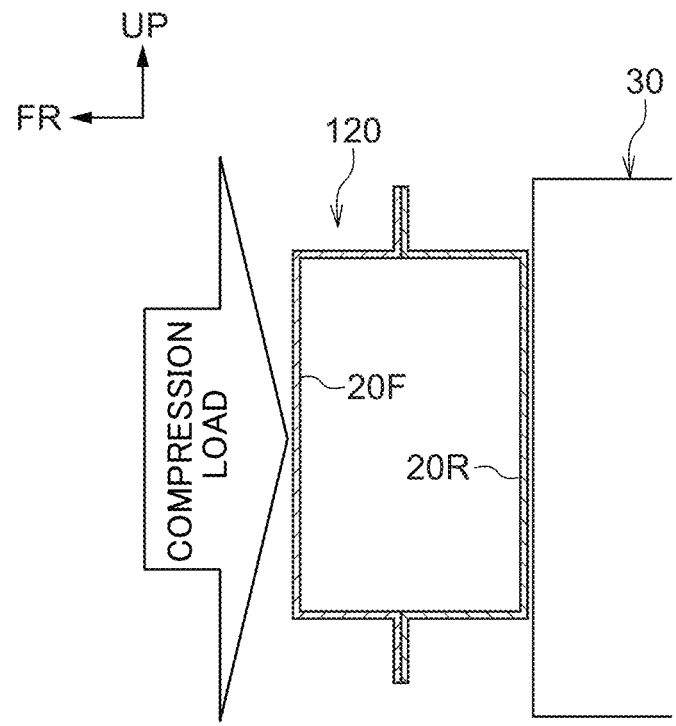
FIG. 3A and FIG. 3B are schematic sectional views showing states of a cross-sectional collapse of a bumper reinforcement of a vehicle front structure according to a comparative example.
Figure 3B:
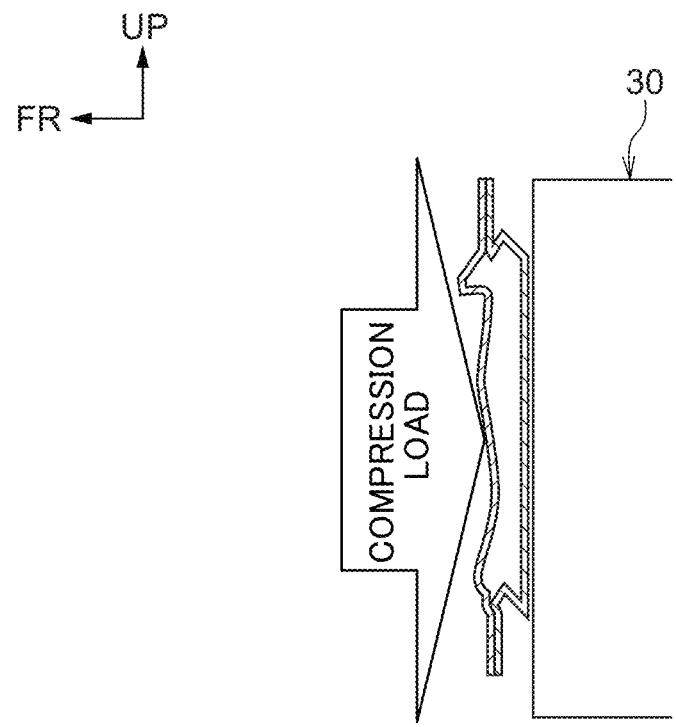

FIG. 3B is a graph showing bending yield strengths according to positions in the vehicle width direction of the bumper reinforcement 20 shown in FIG. 3A. As shown in FIG. 3B, the span of the bumper reinforcement 20 in which the bracing member 24 extends (the certain span including the vehicle width direction center position) has high bending yield strength, and the bending yield strength is lower in spans in which the bracing member 24 does not extend (vicinities of both end portions in the vehicle width direction). The size of the cross section of the bumper reinforcement main body 22 is formed so as to be larger at the vehicle width direction center position and progressively smaller towards the vehicle width direction outer sides. Thus, in accordance with the size of the cross section of the bumper reinforcement main body 22, the bending yield strength progressively decreases towards the vehicle width direction outer sides.

At the position (position in the vehicle width direction) of the bumper reinforcement main body 22 at which the hole 22A is formed and the position at which the hole 22B is formed, the bending yield strength is locally even lower. The hole 22A is formed with, for example, a larger dimension in the vehicle vertical direction than the hole 22B. Thus, the second breakage initiation point 20B is a region in which the bending yield strength is higher than at the first breakage initiation point 20A.

The first breakage initiation point 20A and second breakage initiation point 20B may be formed by the bumper reinforcement 20 being structured as described above.

However, the first breakage initiation point 20A and second breakage initiation point 20B are not limited by the structure described above. As an alternative to the above description, the first breakage initiation point 20A and second breakage initiation point 20B may be formed by, for example, appropriately controlling composition of the bumper reinforcement main body 22 that is fabricated of steel. As another example, the first breakage initiation point 20A and second breakage initiation point 20B may be formed by suitably specifying sizes of the cross section of the bumper reinforcement main body 22 (for example, dimensions in the vehicle front-and-rear direction) in accordance with positions in the vehicle width direction. The first breakage initiation point 20A and second breakage initiation point 20B may be formed by various alternative means.

Operational Effects

Now, operational effects of the present exemplary embodiment are described.

In the present exemplary embodiment, the left and right pair of front side members 10 extend along the vehicle front portion in the vehicle front-and-rear direction. The bumper reinforcement 20 extends along the vehicle width direction and links the front ends of the left and right pair of front side members 10 together. The power unit 30 is disposed between the left and right pair of front side members 10 to the vehicle rear of the bumper reinforcement 20.

The power unit 30 is structured by the engine 30R that constitutes a right side region thereof and the transaxle 30L that constitutes a left side region being connected to one another. Because the gearbox 44 is provided in the area between the dash portion 40 and the power unit 30, if the power unit 30 is translated toward the vehicle rear, the power unit 30 will be braced first by the gearbox 44 serving as the rear bracing portion.

The bumper reinforcement 20 includes the first breakage initiation point 20A, which is the first part of the bumper reinforcement 20 to break at the time of a center pole collision, at a position that is offset from the vehicle width direction center position. As shown in FIG. 1C, the position of the first breakage initiation point 20A is specified such that at the time of a center pole collision, the first breakage initiation point 20A transmits a collision load to equipment at the side of the engine 30R and transaxle 30L that is to be braced by the gearbox 44 (in the present exemplary embodiment, the transaxle 30L that is the left side apparatus).

Therefore, in the vehicle front structure S1 according to the present exemplary embodiment, at the time of a center pole collision, the deformation mode described below is likely to be manifested.

Figure 1B:
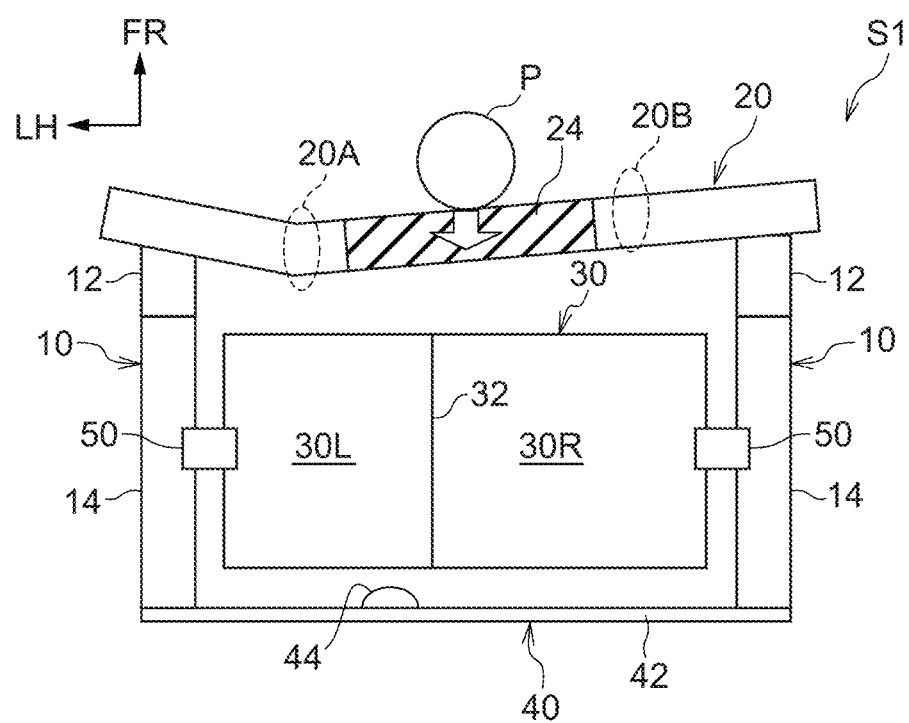
FIG. 1B is a schematic plan view showing an instant when a center pole collision occurs at the vehicle front structure according to the exemplary embodiment and a bumper reinforcement breaks at a first breakage initiation point.
Figure 1C:
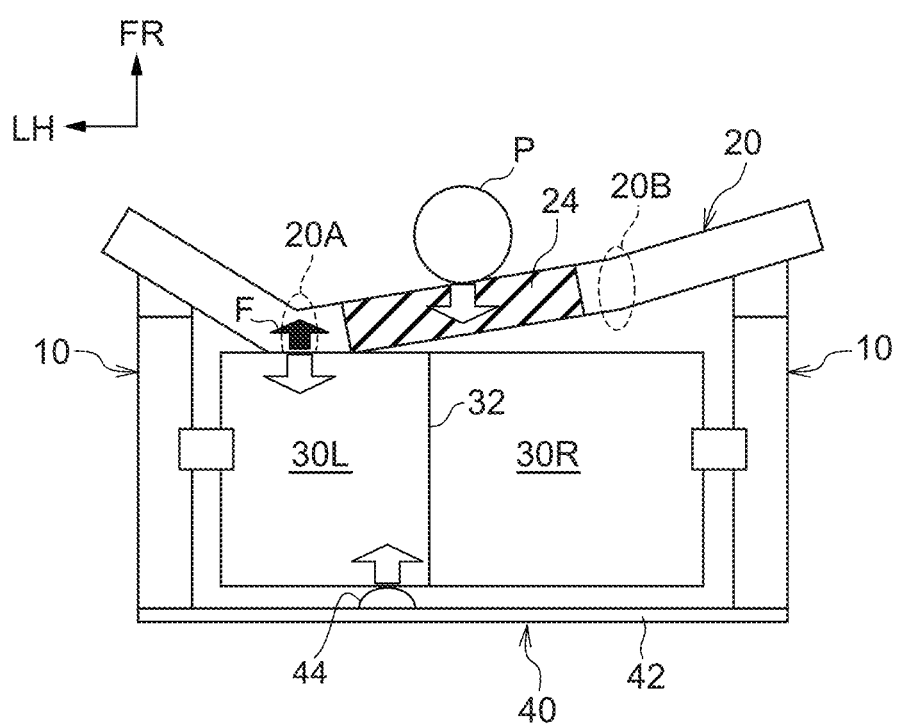
FIG. 1C is a schematic plan view showing an instant when the bumper reinforcement of the vehicle front structure according to the exemplary embodiment breaks at a second breakage initiation point.

That is, at the time of the center pole collision, as shown in FIG. 1B, the bumper reinforcement 20 does not break at the vehicle width direction central position against which the pole abuts but breaks at the first breakage initiation point 20A at the position that is offset from the vehicle width direction center position (the position offset to the left side in the present exemplary embodiment). Subsequently, as shown in FIG. 1C, the first breakage initiation point 20A of the bumper reinforcement 20 transmits a collision load to, of the engine 30R and transaxle 30L of the power unit 30, the transaxle 30L. When the power unit 30 is moved toward the vehicle rear by the collision load, the power unit 30 (the transaxle 30L) is braced by the gearbox 44. At this time, because the apparatus (the transaxle 30L) braced by the gearbox 44 is the same apparatus as the apparatus (the transaxle 30L) to which the first breakage initiation point 20A transmits the collision load, a shearing force produced at the connection region 32 between the engine 30R and the transaxle 30L is not large. As a result, power unit breakage is suppressed.

Figure 1D:
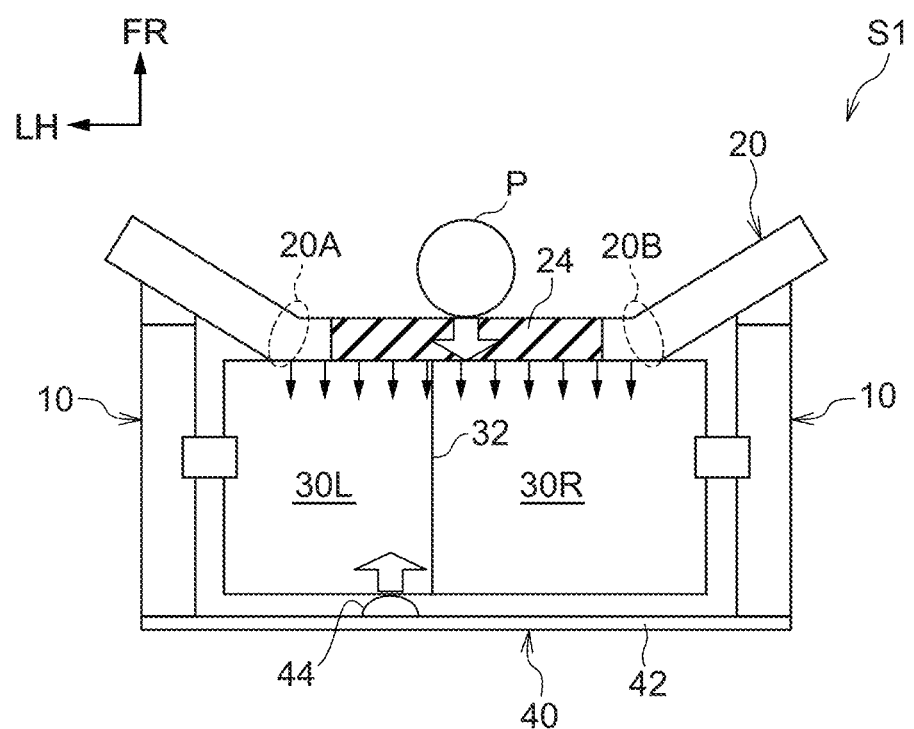
FIG. 1D is a schematic view showing a state in which the bumper reinforcement of the vehicle front structure according to the exemplary embodiment pushes an area of a power unit.

Because power unit breakage is suppressed, a reaction force from the power unit 30 against the bumper reinforcement 20 at the first breakage initiation point 20A (see arrow F in FIG. 1C) is large. Therefore, as shown in FIG. 1C, a second breaking is likely to occur in the bumper reinforcement 20. When the second breaking occurs, as shown in FIG. 1D, the power unit 30 is pushed toward the vehicle rear by the span between the two bent portions of the bumper reinforcement 20 (an area is pushed). Thus, the collision load may be dispersed in the vehicle direction. As a result, a localized application of force to the dash portion 40 may be suppressed, as a result of which deformation of the passenger compartment may be suppressed.

In the present exemplary embodiment, the bumper reinforcement 20 includes the second breakage initiation point 20B, with lower bending yield strength than other portions of the bumper reinforcement 20 but higher bending yield strength than the first breakage initiation point 20A, at a position at the opposite side of the vehicle width direction center position from the side thereof at which the first breakage initiation point 20A is disposed.

Therefore, as shown in FIG. 1C, the second breaking that occurs in the bumper reinforcement 20 is likely to occur at a position (the position of the second breakage initiation point 20B) at the opposite side of the vehicle width direction center position from the side thereof at which the first breakage initiation point 20A is disposed. Consequently, as shown in FIG. 1D, the power unit 30 may be pushed toward the vehicle rear by a wider span of the bumper reinforcement 20 in the vehicle width direction than in a deformation mode in which a second breaking occurs at the vehicle width direction center position against which the pole P abuts. Thus, the collision load may be dispersed over a wider span.

Figure 4A:
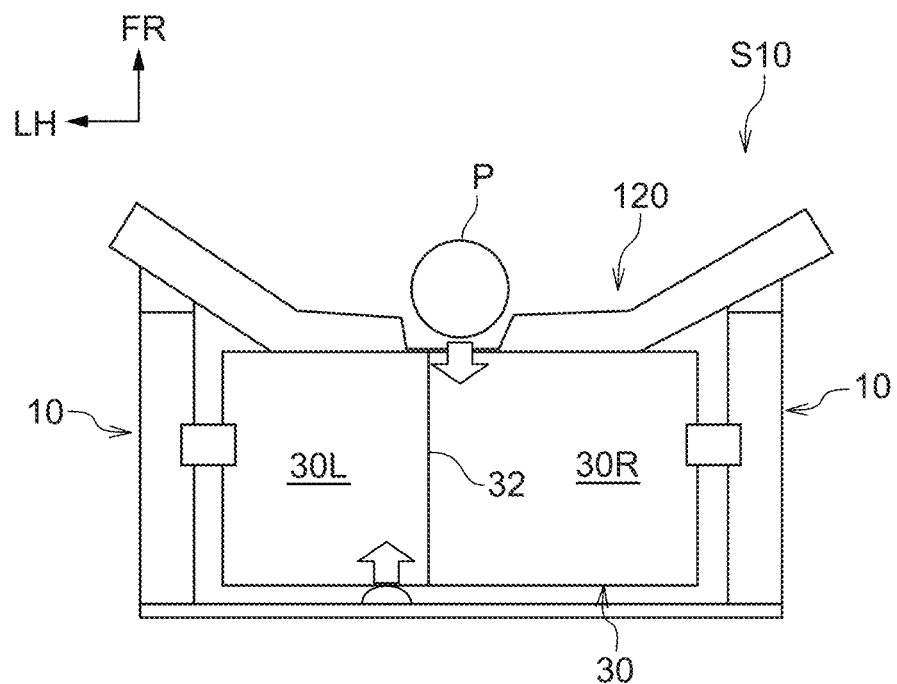
FIG. 4A is a schematic plan view showing a state in which the cross-sectional collapse of the bumper reinforcement of the vehicle front structure according to the comparative example has occurred.
Figure 4B:
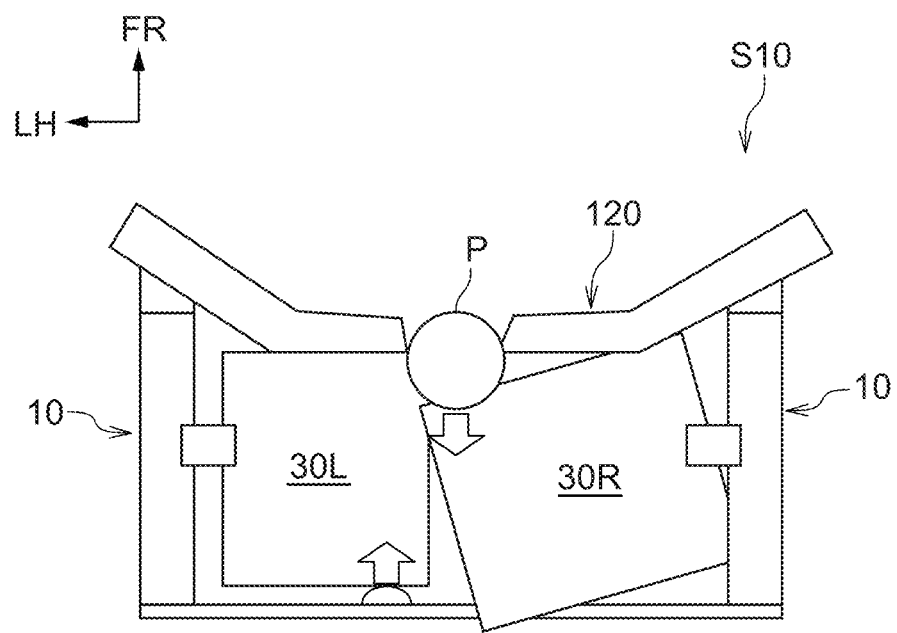
FIG. 4B is a schematic plan view showing a state in which a load is concentrated on a portion of a power unit at the vehicle front structure according to the comparative example and crushing of the power unit has occurred.

When two breaks are formed in the bumper reinforcement 20 as described above, as shown in FIG. 1D, a large compression load in the vehicle front-and-rear direction acts on a region of the bumper reinforcement 20 that is sandwiched between the power unit 30 and the pole P. Therefore, as shown in FIG. 3A and FIG. 3B, if a bumper reinforcement 120 were formed as a chamber structure, the cross section of the bumper reinforcement 120 might collapse in this region. If the cross section of the bumper reinforcement 120 collapses, then as shown in FIG. 4A and FIG. 4B, a load is concentrated on the power unit 30 at the collapsed region after all, and the effect described above (that is, the effect of the collision load being dispersed in the vehicle width direction) may not be provided sufficiently.

Accordingly, in the present exemplary embodiment, as shown in FIG. 1A to FIG. 1D and FIG. 5, the bumper reinforcement 20 includes the bumper reinforcement main body 22 with the chamber structure and the bracing member 24 that is disposed inside the bumper reinforcement main body 22 at the vehicle width direction center position of the vehicle. Because the bracing member 24 is provided inside the bumper reinforcement main body 22 at the vehicle width direction center position of the vehicle, crushing of the cross section in the vicinity of the vehicle width direction center position of the bumper reinforcement 20 is prevented or suppressed.

Therefore, at the time of the center pole collision, even when the bumper reinforcement 20 is sandwiched between the power unit 30 and the pole P, a collapse of the cross section of the bumper reinforcement 20 is prevented or suppressed. As a result, concentration of a load on a portion of the power unit 30 is suppressed.

In the present exemplary embodiment, the span that the bracing member 24 extends in the vehicle width direction is narrower than the span from the first breakage initiation point 20A to the second breakage initiation point 20B in the vehicle width direction. Therefore, weight of the bumper reinforcement 20 may be restrained compared to a mode in which both these spans are the same. Hence, the vehicle may be reduced in weight.

Figure 7:
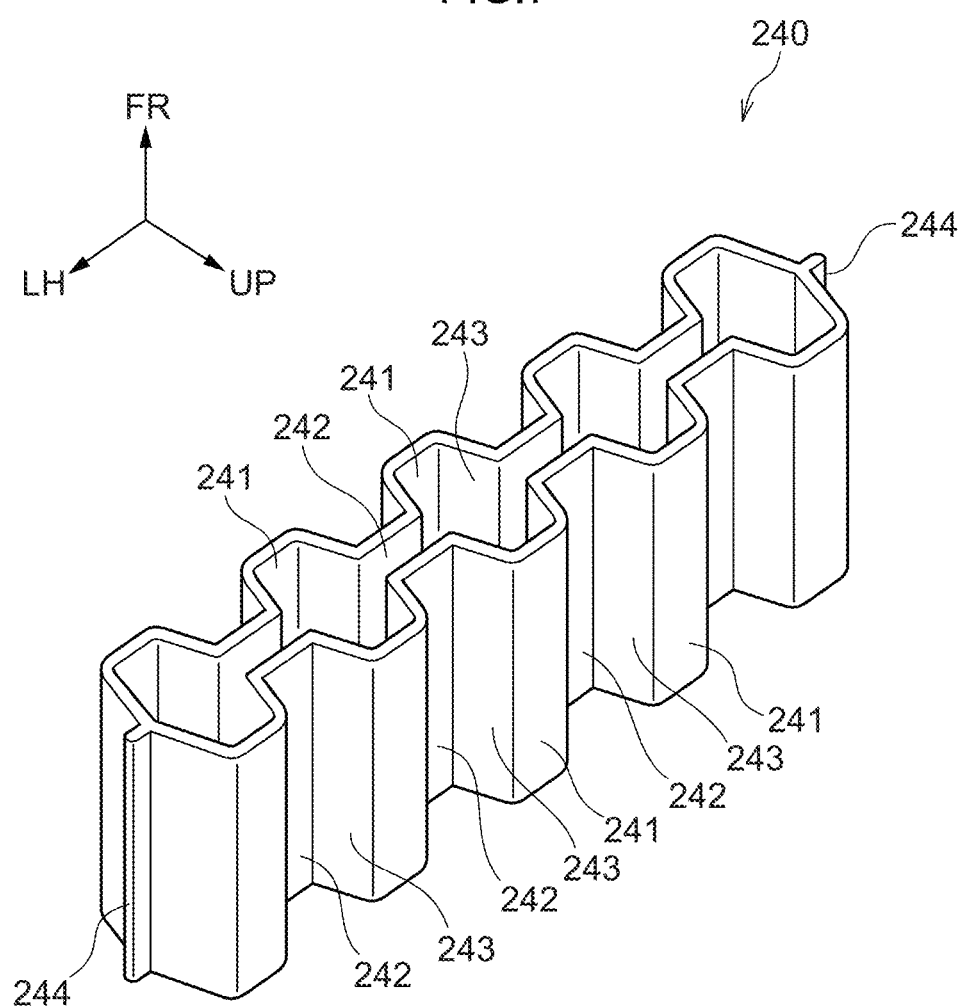
FIG. 7 is a schematic sectional view of a tubular body that is an example of the bracing member.

Now, a bracing member 240 that is an example of the bracing member 24 is described using FIG. 7.

The bracing member 240 shown in FIG. 7 is constituted of a tubular body that includes polygonal shapes in cross section. The bracing member 240 is disposed with an axis of the tubular body oriented in the vehicle front-and-rear direction.

The bracing member 240 includes a plural number of top walls 241, a plural number of bottom walls 242, and a plural number of connecting walls 243 that connect the top walls 241 with the bottom walls 242. The top walls 241 and bottom walls 242 have flat plate shapes, plate thickness directions of which are oriented in the vehicle vertical direction. The bottom walls 242 are disposed at the sides of the top walls 241 in the vehicle vertical direction at which the middle of the bracing member 240 is disposed. The connecting walls 243 have flat plate shapes, plate thickness directions of which are oriented in directions that are angled relative to the vehicle width direction. In a vehicle front-and-rear direction view, the connecting walls 243 and top walls 241 form obtuse angles, and the connecting walls 243 and bottom walls 242 form obtuse angles. The top walls 241, bottom walls 242 and connecting walls 243 all extend in the vehicle front-and-rear direction and respectively function as yield strength walls of the present disclosure.

Thus, in the bracing member 240 shown in FIG. 7, the plural top walls 241, bottom walls 242 and connecting walls 243 serving as yield strength walls that are respectively formed in flat plate shapes are formed continuously with one another along the vehicle width direction. Thus, each two adjacent yield strength walls (the top wall 241 and connecting wall 243 or the connecting wall 243 and bottom wall 242) differ in attitude relative to the vertical direction.

The bracing member 240 may be formed by combining an upper side member that structures a vehicle upper side region of the bracing member 240 with a lower side member that structures a vehicle lower side region of the bracing member 240. More specifically, the bracing member 240 may be fabricated by joining the upper side member to the lower side member by spot welding at flange portions 244 or the like. A material of the bracing member 240 that can be mentioned is steel, aluminum, a fiber-reinforced synthetic resin (FRP) or the like. When the bracing member 240 is formed of steel, the steel that is employed may be a high-tensile strength steel with, for example, a thickness dimension of 1.6 mm and a tensile strength of the order of 590 MPa. With regard to costs of members, fabrication steps such as a joining process and the like, it is preferable to employ a material the same as the material of the bumper reinforcement main body 22.

The yield strength walls of the bracing member 240 shown in FIG. 7 are formed in flat plate shapes, but yield strength walls of the present disclosure are not limited thus. The yield strength walls may include shapes that form circular arcs in the vehicle front-and-rear direction view (curvatures of which need not necessarily be constant).

Figure 8:
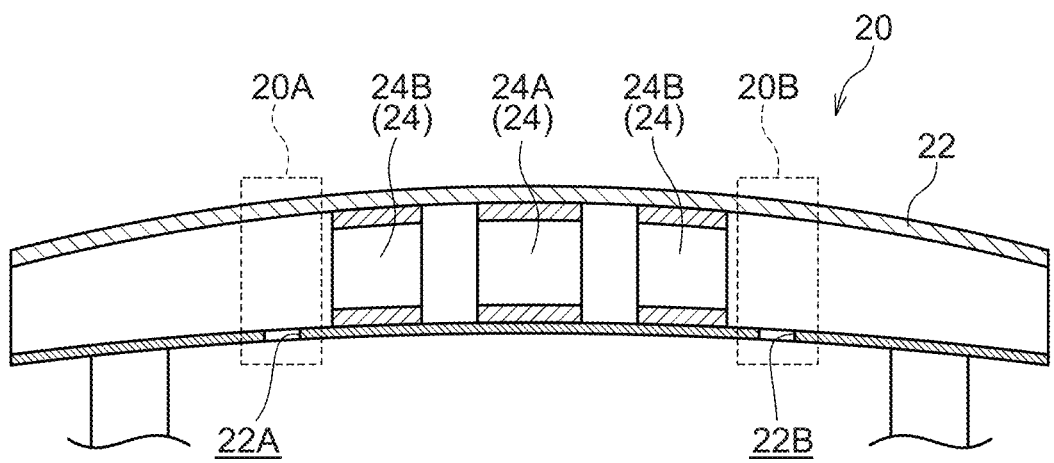
FIG. 8 is a schematic sectional view showing an alternative mode of disposition of the bracing member.

Now, an alternative mode of the bumper reinforcement 20 is described using FIG. 8.

In the bumper reinforcement 20 shown in FIG. 8, the disposition of the bracing member 24 differs from the disposition shown in FIG. 2. More specifically, the bumper reinforcement 20 according to this mode is provided with the bumper reinforcement main body 22 with the chamber structure and a plural number of the bracing members 24 serving as the cross-sectional collapse prevention member, which are provided inside the bumper reinforcement main body 22. The plural bracing members 24 are formed as a first bracing member 24A, which is provided at the vehicle width direction center position, and a pair of second bracing members 24B, which are disposed to be spaced apart from both sides in the vehicle width direction of the first bracing member 24A.

The first breakage initiation point 20A and the second breakage initiation point 20B are each formed in regions corresponding to the vehicle width direction outer sides relative to the pair of second bracing members 24B. In the example shown in the drawing, the first breakage initiation point 20A and second breakage initiation point 20B are formed by the hole 22A and hole 22B that are formed in the wall portion at the vehicle rear of the bumper reinforcement main body 22.

In the mode shown in FIG. 7, the span through which the bracing members 24 extend (specifically, the sum of spans through which the first bracing member 24A and the pair of second bracing members 24B extend) is smaller than the span between the first breakage initiation point 20A and the second breakage initiation point 20B.

Supplementary Descriptions of the Exemplary Embodiment

In the exemplary embodiment described above, an example is described in which, of the left side apparatus and the right side apparatus, the apparatus (the transaxle 30L) that is braced by the gearbox 44 serving as the rear bracing portion is the same apparatus as the apparatus (the transaxle 30L) to which the first breakage initiation point 20A transmits a collision load, but the present disclosure is not limited thus. Even if the apparatus braced by the rear bracing portion is not the same as the apparatus to which the first breakage initiation point 20A transmits a collision load, two breaks may be formed in the bumper reinforcement 20 by a reaction force against the bumper reinforcement 20 from the power unit 30 acting at the first breakage initiation point 20A.

In the exemplary embodiment described above, an example is described in which the bracing member 24 serving as the cross-sectional collapse prevention member is disposed so as to be in area contact with the front wall and rear wall of the bumper reinforcement main body 22, and the bracing member 24 braces the front wall and rear wall in the front-and-rear direction, but the cross-sectional collapse prevention member of the present disclosure is not limited thus. Even a structure that is not in area contact with the front wall and rear wall of the bumper reinforcement main body 22 may function as the cross-sectional collapse prevention member.

In the exemplary embodiment described above, an example is described in which the gearbox 44 protrudes to the vehicle front relative to the dash panel 42 that is a general portion of the dash portion 40, and the gearbox 44 functions as the rear bracing portion, but the present disclosure is not limited thus.

For example, a mode is possible in which a portion of the power unit 30 protrudes to the rear and this portion is braced first at the dash portion 40 by, for example, the dash panel 42 (in which case a portion of the dash panel 42 corresponds to the rear bracing portion). In this mode too (that is, even when a portion of the dash portion is the rear bracing portion), the rear bracing portion can be described as being provided in an area between the dash portion and the power unit.

In the exemplary embodiment described above, an example is described in which the gearbox 44 serving as the rear bracing portion is disposed at a position that is offset to a vehicle width direction outer side relative to the vehicle width direction center position, but the present disclosure is not limited thus. For example, the rear bracing portion may be disposed at the vehicle width direction center position. In this case, if it is assumed that the structure of the power unit 30 is the structure according to the exemplary embodiment described above, the rear bracing portion is to brace the engine 30R (the right side apparatus). Therefore, the bumper reinforcement 20 must be formed with a structure in which the first breakage initiation point 20A is provided at the right side relative to the vehicle width direction center position, in order for the apparatus that is braced by the rear bracing portion to be the same apparatus as the apparatus to which the first breakage initiation point transmits a collision load.

The rear bracing portion of the present disclosure is not limited to the gearbox 44. For example, the rear bracing portion may be a master cylinder, may be the dash panel 42 that is the general portion of the dash portion 40 and may be the dash cross-member, which is a framework member linking together front end portions of a left and right pair of rockers (framework members that extend in the vehicle front-and-rear direction along both of vehicle width direction end portions of a vehicle lower portion).

The meaning of the term "rear bracing portion" as used in the present disclosure is intended to include a structure that may produce a reaction force against a power unit that is moving toward the vehicle rear. Therefore, a member (or portion) that deforms easily when subjected to a collision load via the power unit, such as a pipe or the like, does not correspond to the rear bracing portion.

In the exemplary embodiment described above, an example is described in which the second breakage initiation point 20B is provided at a position that is symmetrical with the first breakage initiation point 20A about the vehicle width direction center position, but the present disclosure is not limited thus. It is sufficient that the second breakage initiation point 20B be provided at a position at the opposite side of the vehicle width direction center position from the side thereof at which the first breakage initiation point 20A is provided.

In the exemplary embodiment described above, an example is described in which, as shown in FIG. 1A, the first breakage initiation point 20A is specified to be at a position at the vehicle width direction outer side relative to the rear bracing portion (the gearbox 44), but the present disclosure is not limited thus. The first breakage initiation point 20A may be specified to be at a position at the vehicle width direction inner side relative to the rear bracing portion.

In the exemplary embodiment described above, although not described for the sake of simplicity, a cooling unit and suchlike, which are not shown in the drawings, are ordinarily disposed between the bumper reinforcement 20 and the power unit 30. Consequently, when a center pole collision occurs and the first breakage initiation point 20A of the bumper reinforcement 20 breaks and deforms toward the side thereof at which the power unit 30 is disposed, the collision load is transmitted from the bumper reinforcement 20 to the power unit 30 via the cooling unit and suchlike.

In the exemplary embodiment described above, an example is described in which the power unit 30 is structured by the engine 30R that structures the right side region and the transaxle 30L that structures the left side region being connected to one another, but the present disclosure is not limited thus.

A mode of fixing of the bracing member 24 to the bumper reinforcement main body 22 is not particularly limited. For example, the front face of the bracing member 24 may be fixed to the front wall of the bumper reinforcement main body 22, and the rear face of the bracing member 24 may abut against the rear wall of the bumper reinforcement main body 22 in a state in which the rear face is not fixed to the rear wall, or the rear face of the bracing member 24 and the rear wall of the bumper reinforcement main body 22 may be disposed with a small gap therebetween.

The front face of the bracing member 24 may be formed in a shape that runs along an inner face shape of the front wall of the bumper reinforcement main body 22, which facilitates assurance of fixing strength between the front face of the bracing member 24 and the front wall of the bumper reinforcement main body 22.

The bracing member 24 may be constant in shape in cross sections intersecting the vehicle width direction, in a certain span that is wide to both sides in the vehicle width direction from the vehicle width direction center portion (a span with a length of at least 254 mm). In this case, inner face shapes of the bumper reinforcement main body 22 may also be constant in the certain span. Consequently, a load from a pole may be taken up appropriately.

The bracing member 24 may be a member that includes plural circular tube members. Each of the plural circular tube members is disposed in an attitude in which the axis thereof runs in the vehicle front-and-rear direction. The plural circular tube members are disposed to be arrayed in the vehicle width direction. The circular tube members that are adjacent to one another in the vehicle width direction may be disposed in states touching one another, and may be disposed in states with gaps therebetween. The circular tube members of this mode function as yield strength walls along the vehicle front-and-rear direction.

In the exemplary embodiment described above, an example is described in which the bracing member 24 is provided at the vehicle width direction center position of the bumper reinforcement main body 22, but the present disclosure is not limited thus. For example, a small span extending in the vehicle width direction that includes the vehicle width direction center position of the bumper reinforcement main body 22 may be a span in which the bracing members 24 are not provided. Crushing by a center pole collision of the cross section of the bumper reinforcement 20 at the vehicle width direction center position may be suppressed in this case too, depending on the span in which the bracing member 24 is not present, the strength of the bracing members 24 and the like.

In the exemplary embodiment described above, an example is described in which no bracing members are disposed at the vehicle width direction outer sides of the pair of breakage initiation points 20A and 20B. However, the present disclosure does not exclude modes in which bracing members are disposed at the vehicle width direction outer sides of the pair of breakage initiation points 20A and 20B.

EXPLANATION OF THE REFERENCE SYMBOLS

S1 Vehicle front structure
10 Front side member
20 Bumper RF (bumper reinforcement)
20A First breakage initiation point
20B Second breakage initiation point
22 Bumper reinforcement main body
24 Bracing member (cross-sectional collapse prevention member)
30 Power unit
P Pole

The invention claimed is:

1. A vehicle front structure, comprising:
a pair of left and right front side members that extend in a vehicle front-and-rear direction along a vehicle front portion;
a bumper reinforcement that extends in a vehicle width direction and links front ends of the pair of left and right front side members with one another; and
a power unit disposed between the pair of left and right front side members at a vehicle rear side of the bumper reinforcement, wherein:
the bumper reinforcement includes:
a first breakage initiation point at a first position at one side of the vehicle in the vehicle width direction relative to a center position of the vehicle in the vehicle width direction, and
a second breakage initiation point at a second position at another side of the vehicle in the vehicle width direction relative to the center position of the vehicle;
the first breakage initiation point is a region with a bending yield strength lower than in other regions of the bumper reinforcement,
the first breakage initiation point is configured to break first on the bumper reinforcement, in response to a pole-shaped object colliding from a front at the center position of the vehicle;
the second breakage initiation point is a region with a bending yield strength lower than the other regions but higher than the first breakage initiation point,
the bumper reinforcement includes:
a bumper reinforcement main body with a chamber structure, and
a cross-sectional collapse prevention member provided inside the bumper reinforcement main body at the center position of the vehicle,
the cross-sectional collapse prevention member is a tubular body disposed with an axis of the tubular body oriented in the vehicle front-and-rear direction,
the cross-sectional collapse prevention member includes
a plurality of top walls,
a plurality of bottom walls, and
a plurality of connecting walls connecting the plurality of top walls with the plurality of bottom walls, respectively,
the plurality of top walls and the plurality of bottom walls have flat plate shapes with plate thickness directions oriented in a vehicle vertical direction,
the plurality of bottom walls is located closer to a central side of the cross-sectional collapse prevention member than the plurality of top walls in the vehicle vertical direction, and
each of (i) the plurality of top walls, (ii) the plurality of bottom walls, and (iii) the plurality of connecting walls extends in the vehicle front-and-rear direction and configures a yield strength wall.

2. The vehicle front structure according to claim 1, wherein
two adjacent yield strength walls differ in attitude relative to the vehicle vertical direction.

3. The vehicle front structure according to claim 1, wherein
the cross-sectional collapse prevention member is fixed to a front wall of the bumper reinforcement main body and is not fixed to a rear wall of the bumper reinforcement main body.

4. The vehicle front structure according to claim 1, wherein
- each of the plurality of connecting walls has a flat plate shape with a plate thickness direction oriented at an angle relative to the vehicle width direction, and
- in a view along the vehicle front-and-rear direction,
  - the plurality of connecting walls and the plurality of top walls form obtuse angles, respectively, and
  - the plurality of connecting walls and the plurality of bottom walls form obtuse angles, respectively.

* * * * *